United States Patent
Wong et al.

(10) Patent No.: US 10,713,373 B2
(45) Date of Patent: Jul. 14, 2020

(54) COMPUTING SYSTEM WITH INFORMATION STORAGE MECHANISM AND METHOD OF OPERATION THEREOF

(71) Applicant: LifeSite, Inc., Mountain View, CA (US)

(72) Inventors: Christopher Lloyd Wong, San Jose, CA (US); Barney G. Lee, Santa Clara, CA (US); Joseph Michael Kolba, Endicott, NY (US); Scott Anthony Sylvester, Endicott, NY (US)

(73) Assignee: LifeSite, Inc., Mountain View, CA (US)

( * ) Notice: Subject to any disclaimer, the term of this patent is extended or adjusted under 35 U.S.C. 154(b) by 519 days.

(21) Appl. No.: 15/428,936

(22) Filed: Feb. 9, 2017

(65) Prior Publication Data

US 2018/0225472 A1    Aug. 9, 2018

(51) Int. Cl.
*G06F 21/62* (2013.01)
*H04L 29/06* (2006.01)

(52) U.S. Cl.
CPC ........ *G06F 21/6218* (2013.01); *H04L 63/102* (2013.01); *H04L 63/1416* (2013.01); *H04L 63/1441* (2013.01)

(58) Field of Classification Search
CPC ............. G06F 21/6218; H04L 63/1441; H04L 63/1416; H04L 63/102

USPC .......................................................... 713/165
See application file for complete search history.

(56) References Cited

U.S. PATENT DOCUMENTS

| | | | |
|---|---|---|---|
| 8,489,687 B2 | 7/2013 | Fein et al. | |
| 8,625,789 B2 | 1/2014 | McGowan | |
| 9,280,670 B2 | 3/2016 | Conte | |
| 9,369,445 B2 | 6/2016 | Mahajan et al. | |
| 2007/0067644 A1 | 3/2007 | Flynn et al. | |
| 2009/0077645 A1 | 3/2009 | Kottahachchi | |
| 2009/0168994 A1 | 7/2009 | Heuss | |
| 2014/0177829 A1 | 6/2014 | MacMillan et al. | |
| 2015/0117625 A1 | 4/2015 | Gonen et al. | |
| 2018/0047021 A1* | 2/2018 | Uppalapati | G06Q 20/385 |
| 2018/0054456 A1* | 2/2018 | Ground | H04L 63/1433 |

* cited by examiner

*Primary Examiner* — Kambiz Zand
*Assistant Examiner* — Benjamin A Kaplan
(74) *Attorney, Agent, or Firm* — Perspectives Law Group, Corp.

(57) ABSTRACT

A computing system includes: a control unit configured to: receive user information through a vault user account; process the user information for storage in an information vault; implement a security protocol for the vault user account including to determine a security breach to the vault user account based on receiving an electronic communication from a user electronic contact address addressed to a breach detection contact address; a storage unit, coupled to the control unit, configured to store the user information.

20 Claims, 5 Drawing Sheets

COMPUTING SYSTEM WITH INFORMATION STORAGE MECHANISM AND METHOD OF OPERATION THEREOF

TECHNICAL FIELD

An embodiment of the present invention relates generally to a computing system, and more particularly to a system for information storage.

BACKGROUND

Modern consumer and industrial electronics, especially devices such grid-computing resources, a virtualized computer resource, cloud computing resource, are providing increasing levels of functionality to support modern life including remote and delocalized information storage. Research and development in the existing technologies can take a myriad of different directions.

As users become more empowered with the growth of electronic and computing systems, new and old paradigms begin to take advantage of this new device space. One such advancement has been online storage solutions for personal information. However vulnerability to cyber-attacks on and hacking of the online storage systems as well as identity theft and unauthorized access to personal information has become of increasing concerns to the users.

Thus, a need still remains for a computing system with information storage having improved security features. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, a control unit configured to: receive user information through a vault user account; process the user information for storage in an information vault; implement a security protocol for the vault user account including to determine a security breach to the vault user account based on receiving an electronic communication from a user electronic contact address addressed to a breach detection contact address; a storage unit, coupled to the control unit, configured to store the user information.

An embodiment of the present invention provides a method including: receiving user information through a vault user account; processing the user information for storage in an information vault; and implementing a security protocol for the vault user account including to determine a security breach to the vault user account based on receiving an electronic communication from a user electronic contact address addressed to a breach detection contact address.

An embodiment of the present invention provides a non-transitory computer readable medium including stored thereon instructions to be executed by a control unit comprising: receiving user information through a vault user account; processing the user information for storage in an information vault; and implementing a security protocol for the vault user account including to determine a security breach to the vault user account based on receiving an electronic communication from a user electronic contact address addressed to a breach detection contact address.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
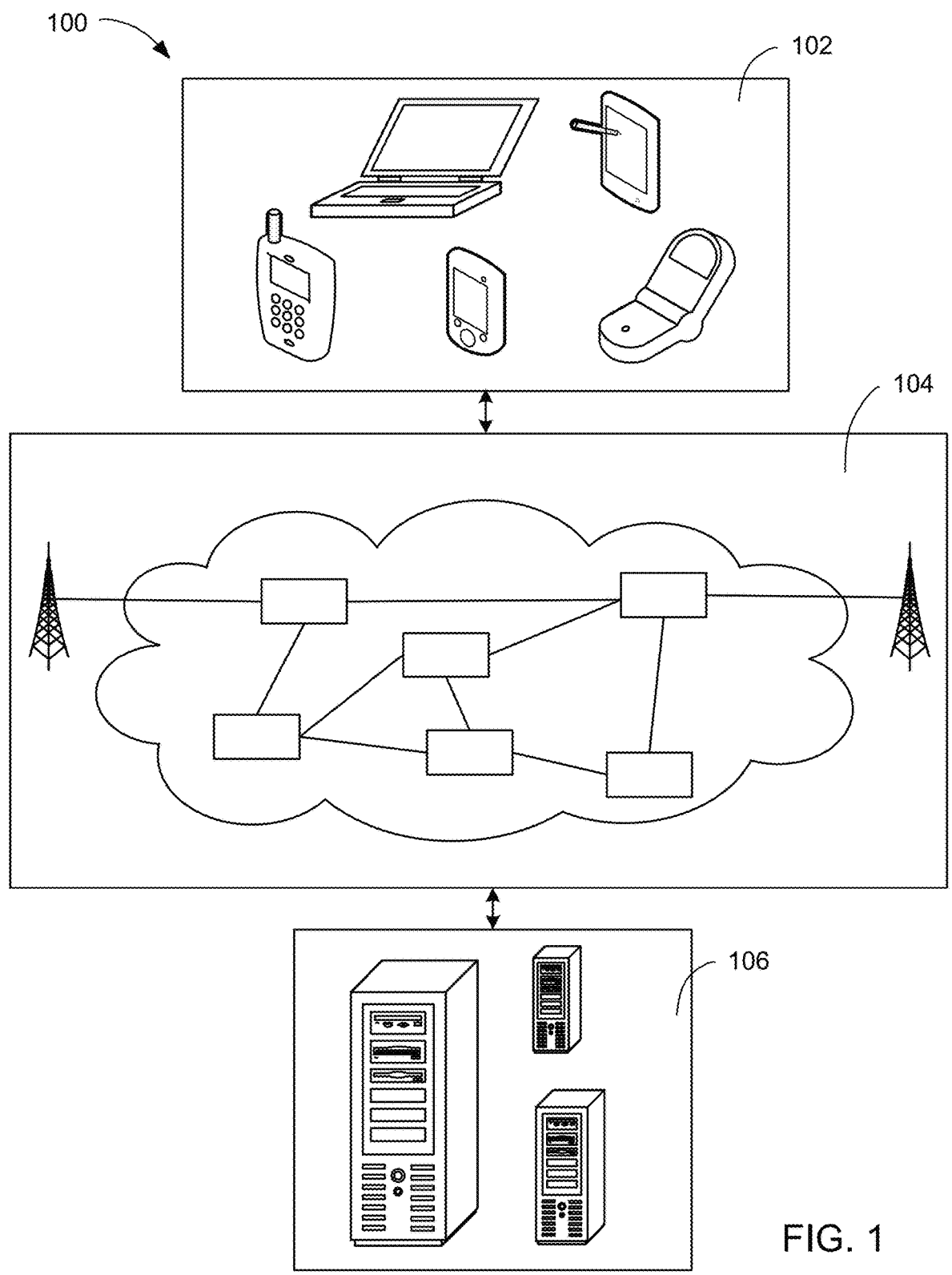
FIG. 1 is a computing system with an information storage mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a computing system 100 with an information storage mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, a tablet computer, a notebook computer, a web-enabled television set, a smart television, or a desktop computer. The first device 102 can couple, either directly or indirectly, to the communication path 104 to communicate with the second device 106 or can be a stand-alone device.

For illustrative purposes, the computing system 100 is described with the first device 102 as a mobile device, although it is understood that the first device 102 can be different types of devices. For example, the first device 102 can also be stationary computing device, such as a desktop computer.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
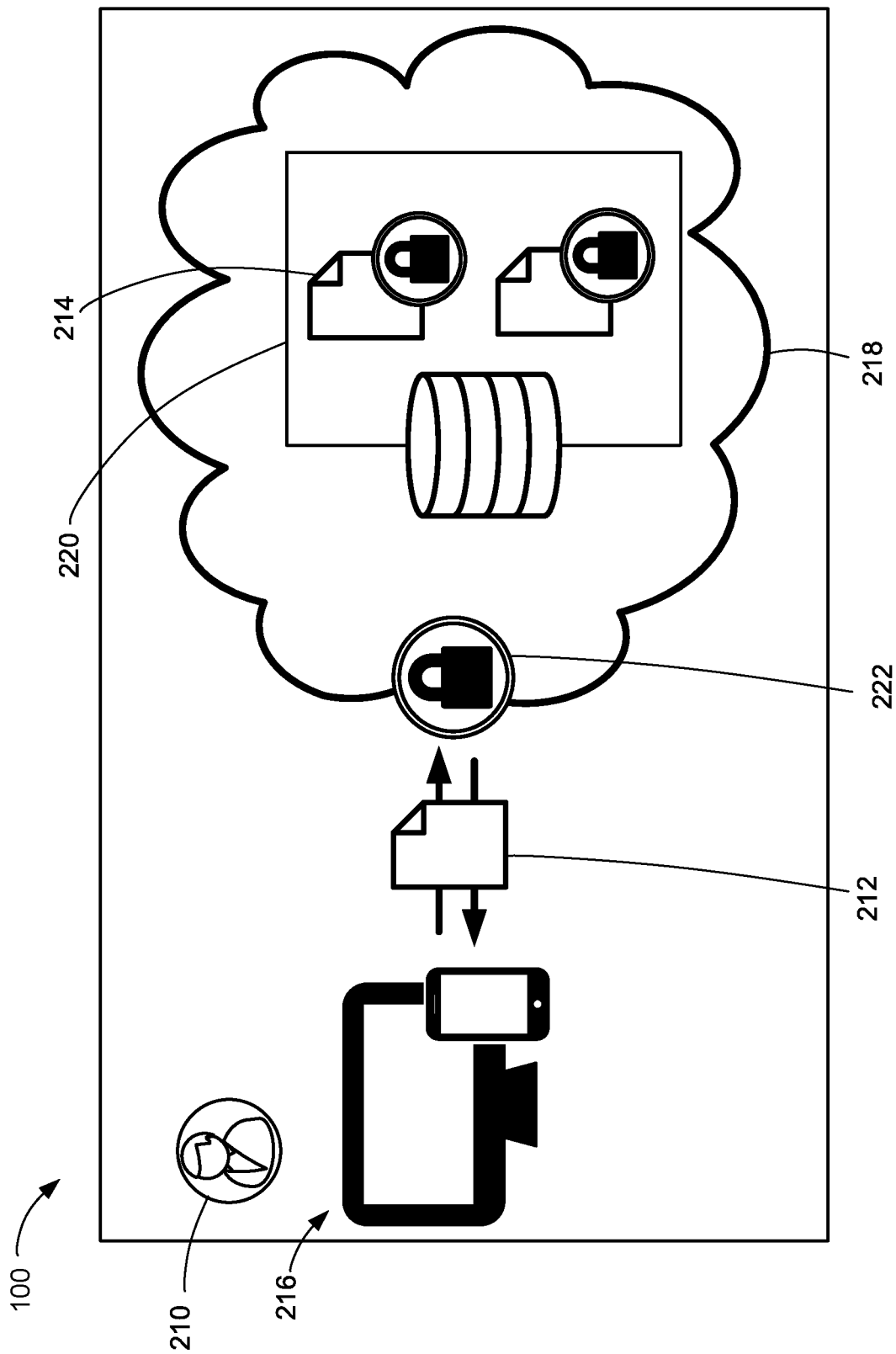
FIG. 2 is an example of an exemplary diagram of the computing system 100.

Referring now to FIG. 2, therein is shown an exemplary diagram of the computing system 100. The diagram depicts a system user 210 accessing an information vault 218. The information vault 218 is a secure virtual storage space. For example, the information vault 218 can be a cloud based storage database for secure storage of user information 212 of the system user 210. The computing system 100 provides the information vault 218 for secure transfer, storage, access, or a combination thereof for the user information 212 of the system user 210.

The user information 212 is information the system user 210 desires to protect from unauthorized access. For example, the user information 212 can include sensitive personal information, such as a social security information. The user information 212 can include electronic files 214, such as electronic documents, such as medical or financial records, or digital images. The user information 212 can be stored on a vault user account 220. The vault user account 220 is a virtual space in the information vault 218 dedicated to the system user 210

The user information 212 can be transmitted from a user device 216, such as the first device 102 of FIG. 1, to the information vault 218 through the communication path 104 of FIG. 1. The computing system 100 can provide a security protocol 222 to ensure that the user information 212 is secure and protected from unauthorized access during transmission to and from the information vault 218 and during storage on the information vault 218.

The security protocol 222 is a protocol that performs security related functions to protect the user information 212. For example, the security protocol 222 can include an encryption protocol or security scheme. As another example, the security protocol 222 can include security features to prevent or defend against attacks, such as "phishing attacks," to get the information to access the vault user account 220, such as login or password. The details of the security protocol 222 will be discussed below.

Figure 3:
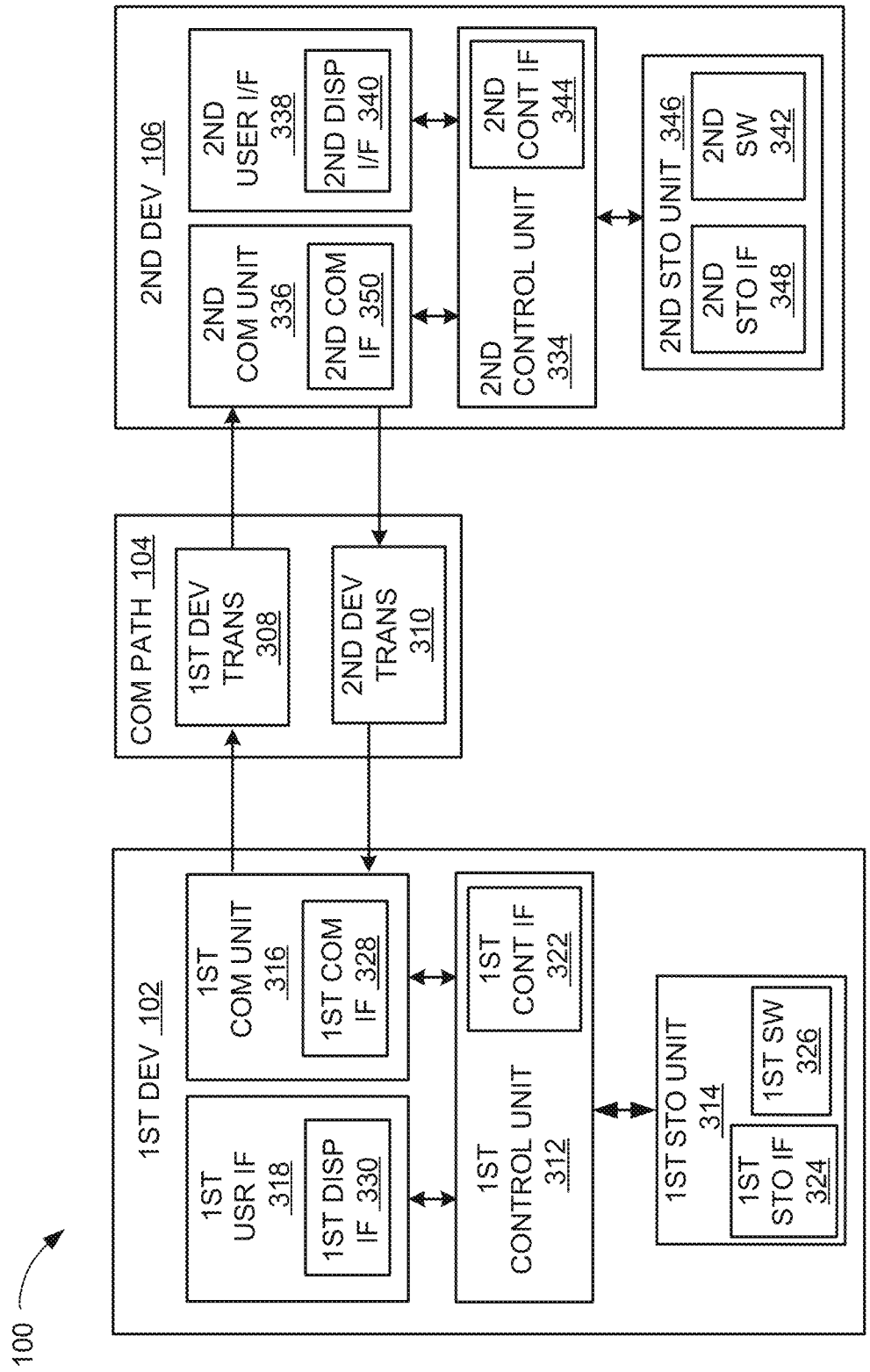
FIG. 3 is an exemplary block diagram of the computing system.

Referring now to FIG. 3, therein is shown an exemplary block diagram of the computing system 100. The computing system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as the protected personal information 220 of FIG. 2.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as the protected personal information 220. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 4:
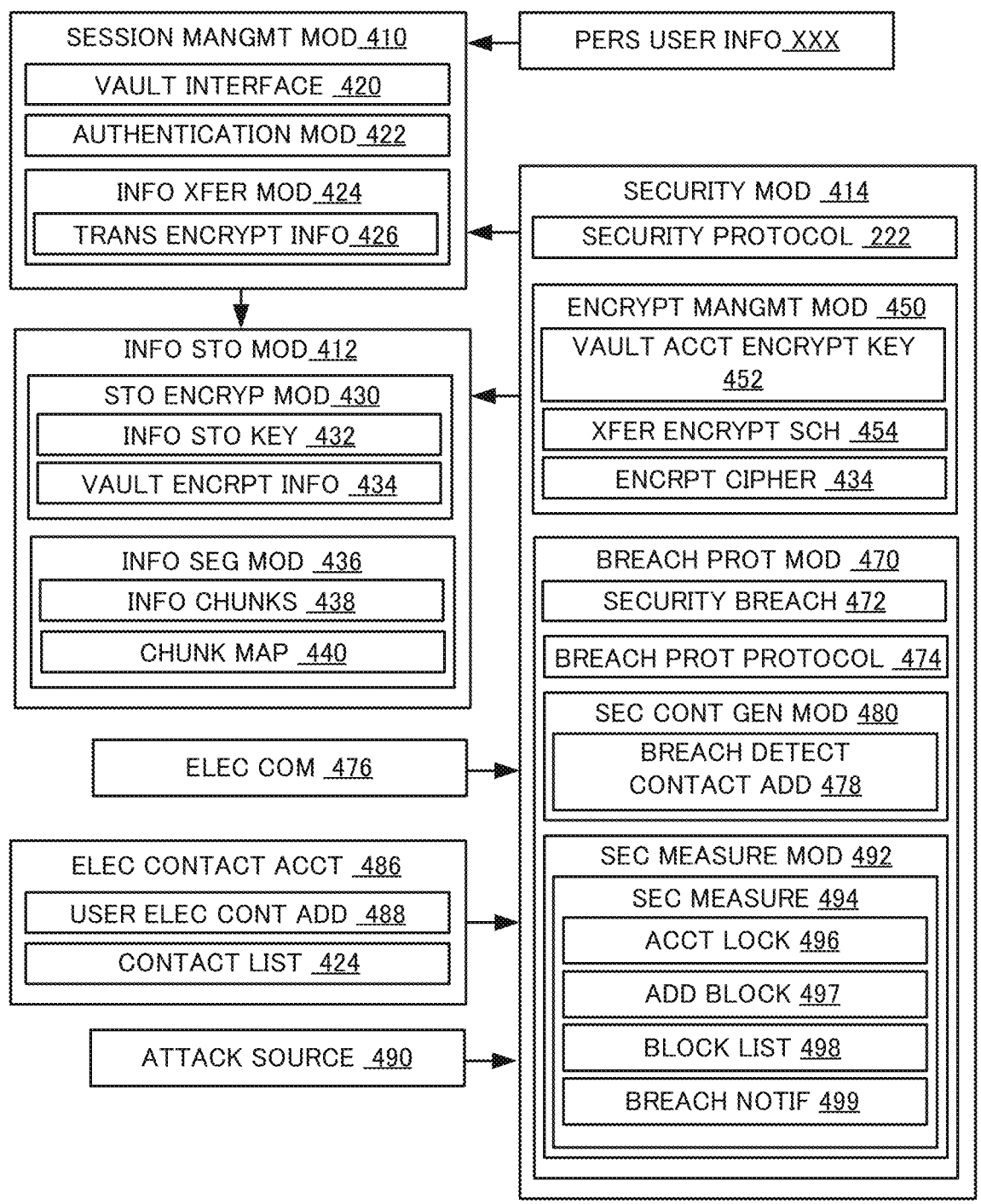
FIG. 4 is a control flow of the computing system.

Referring now to FIG. 4, therein is shown a control flow of the computing system 100. The computing system 100 can include a session management module 410, an information storage module 412, and a security module 414. The information storage module 412 can be coupled to the session management module 410. The security module 414 can be coupled to the information storage module 412.

The session management module 410 is for managing interaction between the system user 210 of FIG. 2 and the information vault 218 of FIG. 2. For example, the session management module 410 can enable the system user 210 to securely connect with the information vault 218 for entry, modification, and viewing the user information 212 of FIG. 2 through a vault interface 420 on the user device 216 of FIG. 2. The vault interface 420 is a graphical user interface for presenting and receiving information. For example, the vault interface 420 can be presented through a mobile application or website. The vault interface 420 can enable the system user 210 to enter, modify, or view the user information 212, upload or download the electronic files 214. As an example, the vault interface 420 can be presented on the first user interface 318 of FIG. 3 for the first device 102.

The session management module 410 can include an authentication module 422 for authenticating the system user 210 when accessing the information vault 218. As an example, the user authentication module 422 can implement a multi-factor authentication, such as a token system, to validate and authenticate the system user 210 when accessing the vault user account 220.

The authentication module 422 can provide secure access to the information vault 218. For example, the authentication module 422 can implement a zero-knowledge system to provide end-to-end encryption of the user information 212. More specifically, the zero-knowledge system prevents the user information 212 from being stored on the user device 216.

The session management module 410 can transmit the user information 212 to the information vault with an information transfer module 424. In an implementation, the information transfer module 424 can generate transmission encrypted information 426 from the user information 212 received on the user device 216. The transmission encrypted information 426 is information that is encrypted for transmission between two devices. For example, the user information 212 received on the user device 216 can be encrypted with an encryption key received from the security module 414, which will be discussed in detail below. The information transfer module 424 can transmit the transmission encrypted information 426 to the information vault 218 for storage.

The computing system 100 can implement the information storage module 412 to process the user information 212 for secure storage in the information vault 218. For example, the information storage module 412 can process the user information 212 by encrypting the user information 212, including the electronic files 214 of FIG. 2 that can be included as the user information 212. As another example, the information storage module 412 can further process the electronic files 214 that have been encrypted by performing a data chunking operation on the electronic files 214 prior to storage.

The information storage module 412 can encrypt the user information 212 for storage with a storage encryption module 430. For example, the storage encryption module 430 can utilize an information storage key 432, which is the encryption key for storing the user information 212. As a specific example, the storage encryption module 430 can implement an encryption scheme, including the information storage key 432, such as a military grade 256-Advanced Encryption Standards (AES), to generate vault encrypted information 434 from the the user information 212. The information storage key 432 can be provided by the security module 414, which will be discussed below.

The information storage module 412 can chunk the vault encrypted information 434, including the electronic files 214 that have been encrypted, with an information segmentation module 436. For example, the information segmentation module 436 can generate information chunks 438 from the vault encrypted information 434 with a data chunking scheme.

It has been discovered that segmenting the user information 212 into the information chunks 438 after encryption, such as after generating the vault encrypted information 434 from the user information 212, provides increased security for the user information 212. More specifically, the individual instances of the information chunks 438 cannot be de-encrypted to provide portions of the user information 212 since all the individual instances of the information chunks 438 are needed to fully de-encrypt the user information 212. Conversely, providing encryption following segmenting the user information 212 can lead to vulnerability of the user information 212 since de-encryption of an individual instance of the information chunks 438 can still provide a portion of the user information 212.

For added security, the information storage module 412 can store each of the information chunks 438 of the user information separately to ensure that the user information 212 is unreadable while in storage. More specifically, each of the information chunks 438 can be stored in non-sequential or adjacent physical or logical addresses within the storage medium, such as the second storage unit 346 of FIG. 3 for the second device 106 of FIG. 1. The information storage module 412 can track the information chunks 438 for the user information 212 with a chunk map 440. The computing system 100 can implement a single-tenancy architecture for storage of the user information 212 in the information vault 218.

The computing system 100 can include the security module 414 for implementing a security protocol 222 for the computing system 100. The security protocol 222 is a scheme to protect information. For example, the security protocol 222 can be a scheme to protect against or prevent unauthorized access to the user information 212 in the information vault 218 through hacking, cyber-attacks, or "phishing attacks."

In one implementation, the security protocol 222 can include a scheme to provide encryption for the user information 212. For example, the security module 414 can include an encryption management module 450 to provide and manage encryption schemes for the computing system 100, including to provide and maintain the encryption keys and cyphers for the information vault 218.

More specifically, the encryption management module 450 can provide each of the accounts, such as the vault user account 220, with the vault account encryption key 452, which is unique to the vault user account 220 and ensures single access to the vault user account 220. For example, the encryption management module 450 can provide unique encryption keys for each instance of the vault user account 220 during transmission of the user information 212 with a transfer encryption scheme 454. As a specific example, transfer encryption scheme 454 can include a high-level Transport Layer Security (TSL)/Secure Socket Layers (SSL), such as a trusted 2048-bit certificate, and a Secure Hash Algorithms (SHA), such as a SHA-256, for secure connection between an internet browser used on the first device 102 and the information vault 218.

Further, the encryption management module 450 can implement various encryption schemes to encrypt the user information 212 for storage in the information vault 218. As a specific example, the encryption management module 450 can implement a rotating encryption key to generate the protected the user information 212, which can rotate the encryption key after specified period of time, such as a number of days. In another specific example, the encryption management module 450 can implement a double encryption scheme. In yet a further example, the encryption management module 450 can rotate an encryption cipher 456 for the information vault 218. More specifically, the computing system 100 can incorporate an object oriented programming architecture that enables the encryption management module 450 to rotate the encryption cipher 456.

In another implementation, the security protocol 222 can provide detection and measures to address a breach in security for the user information 212. More specifically, the security protocol 222 can include a breach protection protocol 474 to protect against solicitation based attacks, such as phishing attacks. In general, the breach protection protocol 474 can determine the occurrence of a security breach 472 through receipt of an electronic communication 476 from an electronic contact address created for the sole purpose of triggering an alert to the occurrence of the security breach. For example, the security module 414 can include a breach protection module 470 to implement the breach protection protocol 474 by generating a breach detection contact address 478, which can be used to determine the security breach 472.

The breach protection module 470 can generate the breach detection contact address 478 with a security contact generation module 480 for the vault user account 220. The breach detection contact address 478 is a contact address for the sole purpose of alerting the computing system 100 of the security breach 472 to the vault user account 220. As an example, the security contact generation module 480 can generate the breach detection contact address 478 upon creation of the vault user account 220. To continue the example, the breach protection module 470 can generate the breach detection contact address 478 dynamically as an electronic mail (e-mail) contact or address. The breach detection contact address 478 can be included in a contact list 484, such as an address book in a communication account or client, for a user electronic contact address 488, such an e-mail address, of the system user 210.

The breach protection module 470 can determine that the security breach 472 to the vault user account 220 has occurred based on receiving the electronic communication 476 from the user electronic contact address 488 to the breach detection contact address 478. In general, when the security breach 472 through a phishing attack occurs in the electronic contact account 486 of the system user 210, the attacking entity, such as malware, will user or steal the user electronic contact address 488 to conduct subsequent or additional attacks, such as sending out mass phishing e-mails, to the contacts in the contact list 484 of the system user 210 from an attack source 490, such as an internet protocol (IP) address. In this case, the breach detection contact address 478 will be included in the subsequent or additional attacks. Since the breach detection contact address 478 is unique for each instance of the vault user account 220, once the electronic communication 476 from the user electronic contact address 488 addressed is received at the breach detection contact address 478, the breach protection module 470 can match to the breach detection contact address 478 that was specifically generated for the vault user account 220 to determine that the security breach 472 has occurred.

When the security breach 472 is determined, the security module 414 can implement a security measure 494 with a security measure module 492. The security measure 494 is an action taken in response to the security breach 472. The security measure 494 can include a number of implementations individually or in combination. For example, in one implementation, the security measure 494 can include an account lock 496 for the vault user account 220. The account lock 496 prevents all access to the vault user account 220 that has experienced the security breach 472. The account lock 496 can be lifted once the system user 210 clears security verification to reestablish control of the account, such as answering security questions and change password to the vault user account 220.

In another implementation, the security measure 494 can include an address block 497. The address block 497 prevents attacks for unauthorized access to the vault user account 220 from the attack source 490. More specifically, the security measure module 492 can identify the attack source 490, such as an IP address, and add it to a block list 498 to prevent or block receiving further access, communications, or attacks from the attack source 490 to the accounts in the information vault 218.

In a further implementation, the security measure 494 can include providing a breach notification 499. The breach notification 499 is a notification to the victim of the security breach 472. The security measure module 492 can send the breach notification 499 to alert the system user 210 that the electronic contact account 486 for the user electronic contact address 488 and vault user account 220 have experienced the security breach 472.

The computing system 100 has been described with module functions or order as an example. The computing system 100 can partition the modules differently or order the modules differently. For example, the first user interface 318 of FIG. 3 for the first device 102 of FIG. 1, can receive the user information 212. The first communication unit 316 of FIG. 3 for the first device 102 can transmit the user information 212 to the second device 106 of FIG. 1. The second control unit 334 of FIG. 3 for the second device 106 can implement the second software 348 of FIG. 3 to execute the information storage module 430, the security module 414, or a combination thereof. The second storage unit 346 of FIG. 3 for the second device 106 can store the user information 212. In a further embodiment, the session management module 410 and associated functions described above can be executed by the first control unit 312, the second control unit 334, or implemented with both the first control unit 312 and the second control unit 334.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Figure 5:
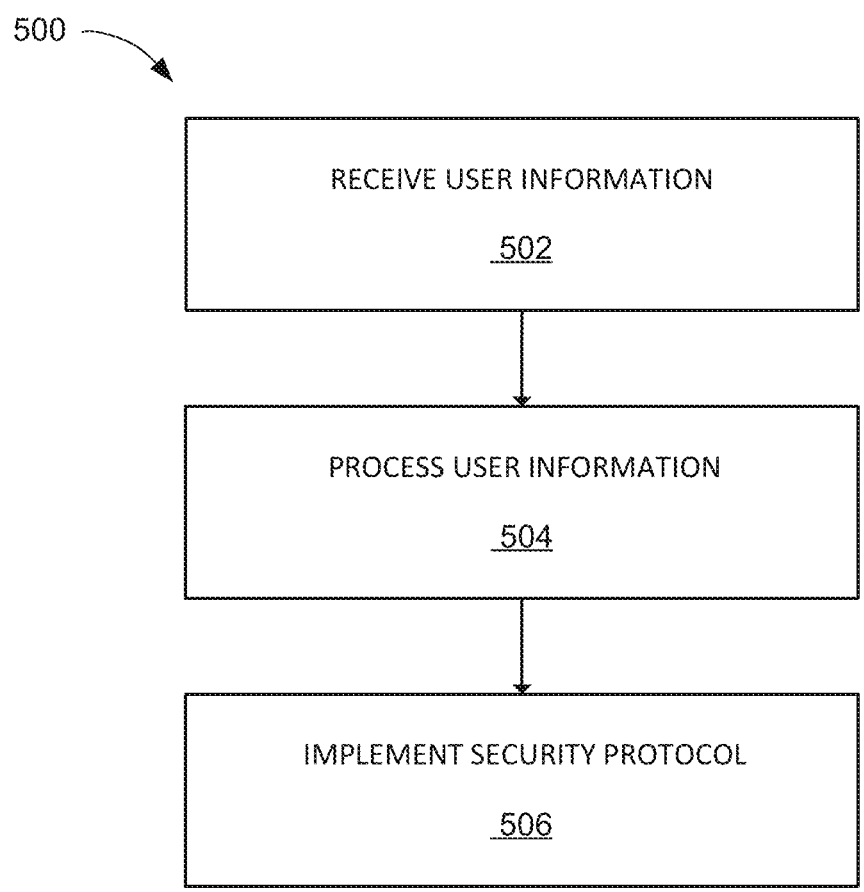
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: receiving user information through a vault user account in a block 502; processing the user information for storage in an information vault in a block 504; and implementing a security protocol for the vault user account including to determine a security breach to the vault user account based on receiving an electronic communication from a user electronic contact address addressed to a breach detection contact address in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit configured to:
receive user information through a vault user account;
process the user information for storage in an information vault including generating an information chunk by dividing, the user information;
implement a security protocol for the vault user account including to determine a security breach to the vault user account based on receiving an electronic communication from a user electronic contact address addressed to a breach detection contact address; and
a storage unit, coupled to the control unit, configured to store the information chunk of the user information.

2. The system as claimed in claim 1 wherein the control unit is configured to implement a security measure for the security breach, wherein the security measure includes an account lock on the vault user account.

3. The system as claimed in claim 1 wherein the control unit is configured to implement a security measure for the security breach, wherein the security measure includes:
determining an attack source of the security breach; and
blocking the attack source of the security breach.

4. The system as claimed in claim 1 the storage unit is configured to implement a security measure of providing a breach notification to the system user when the security breach is determined.

5. The system as claimed in claim 1 wherein the control unit is configured to provide single tenancy for the vault user account for storage of the user information.

6. The system as claimed in claim 1 the control unit is configured to implement the security measure including to rotate an encryption cypher for the information vault.

7. The system as claimed in claim 1 wherein the control unit is configured to:
receive the user information including an electronic file;
process the user information including to:
generate an encrypted file from the electronic file; and
generate the information chunk from the encrypted file.

8. A method of operation of a computing system comprising:
receiving user information through a vault user account;
processing the user information for storage in an information vault including generating an information chunk by dividing the user information; and
implementing a security protocol for the vault user account including to determine a security breach to the vault user account based on receiving an electronic communication from a user electronic contact address addressed to a breach detection contact address.

9. The method as claimed in claim 8 further comprising implementing a security measure for the security breach, wherein the security measure includes an account lock on the vault user account.

10. The method as claimed in claim 8 further comprising implementing a security measure for the security breach, wherein the security measure includes:
determining an attack source of the security breach; and
blocking the attack source of the security breach.

11. The method as claimed in claim 8 further comprising implementing a security measure of providing a breach notification to the system user when the security breach is determined.

12. The method as claimed in claim 8 further comprising providing single tenancy for the vault user account for storage of the user information.

13. The method as claimed in claim 8 wherein implementing the security measure includes rotating an encryption cypher for the information vault.

14. The method as claimed in claim 8 wherein:
receiving the user information includes receiving an electronic file; and
processing the user information includes:
generating an encrypted file from the electronic file; and
generating the information chunk from the encrypted file.

15. A non-transitory computer readable medium including stored thereon instructions to be executed by a control unit comprising:
receiving user information through a vault user account;
processing the user information for storage in an information vault including generating an information chunk by dividing the user information; and implementing a security protocol for the vault user account including to determine a security breach to the vault user account based on receiving an electronic communication from a user electronic contact address addressed to a breach detection contact address.

16. The medium as claimed in claim 15 further comprising implementing a security measure for the security breach, wherein the security measure includes an account lock on the vault user account.

17. The medium as claimed in claim 16 further comprising implementing a security measure for the security breach, wherein the security measure includes:
   determining an attack source of the security breach; and
   blocking the attack source of the security breach.

18. The medium as claimed in claim 16 further comprising implementing a security measure of providing a breach notification to the system user when the security breach is determined.

19. The medium as claimed in claim 16 wherein implementing the security measure includes rotating an encryption cypher for the information vault.

20. The medium as claimed in claim 16 wherein:
   receiving the user information includes receiving an electronic file; and
   processing the user information includes:
   generating an encrypted file from the electronic file; and
   generating the information chunk from the encrypted file.

\* \* \* \* \*